INVENTOR
George E. DeJong

United States Patent Office 3,286,842
Patented Nov. 22, 1966

3,286,842
FILTER APPARATUS
George E. De Jong, 509 Empire Bldg., Rockford, Ill.
Filed July 3, 1962, Ser. No. 207,218
1 Claim. (Cl. 210—275)

This invention relates to apparatus for filtering a liquid, such as a municipal water supply, and has more particular reference to a filtering system having one or more cells which contain a bed of sand and gravel, the liquid to be filtered being introduced above the bed and filtering down through the latter. When the bed becomes partially clogged with foreign matter filtered out of the liquid, it is cleaned by backwashing a liquid up through the bed to carry the foreign matter out of the bed and into a sewer.

The general object of the invention is to provide a new and improved filter apparatus which requires a reduced number of valves, operators and controls and is thereby simpler in construction but which nevertheless operates without a decrease in either efficiency or capacity.

A more detailed object is to provide the sewer in the form of a trough disposed in the cell above both the bed and inlet of the liquid to be filtered whereby the backwash liquid merely overflows into the trough thus eliminating the need for valves in the sewer line and making it possible to use simple check valves to control the flow of liquid to the cell.

Other objects and advantages of the invention will become apparent from the following detailed description taken in connection with the accompanying drawings, in which.

Figure 1:
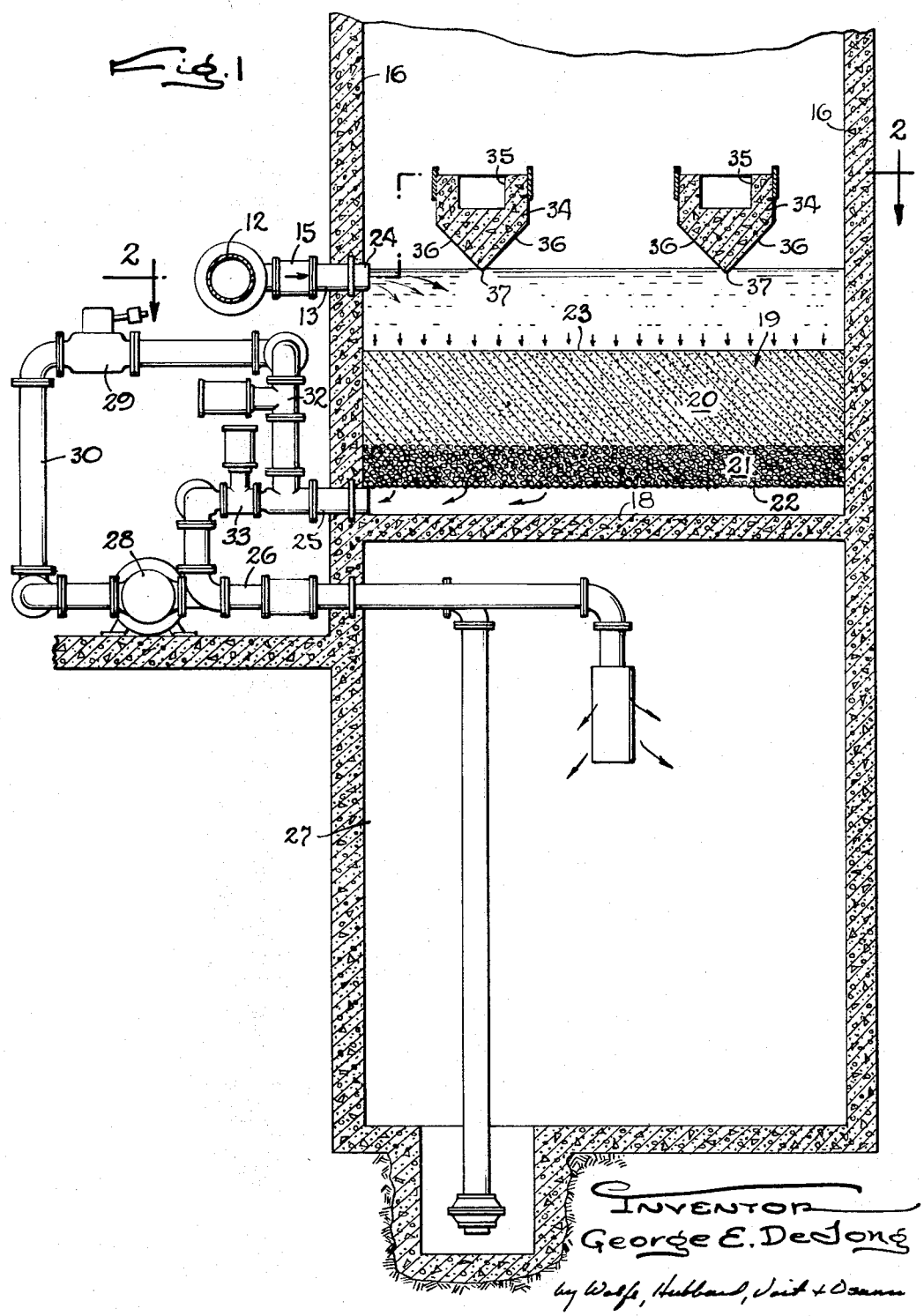
FIGURE 1 is a fragmentary vertical sectional view of a filtration system embodying the novel features of the present invention, the section being taken along the line 1—1 in FIG. 2.
Figure 2:
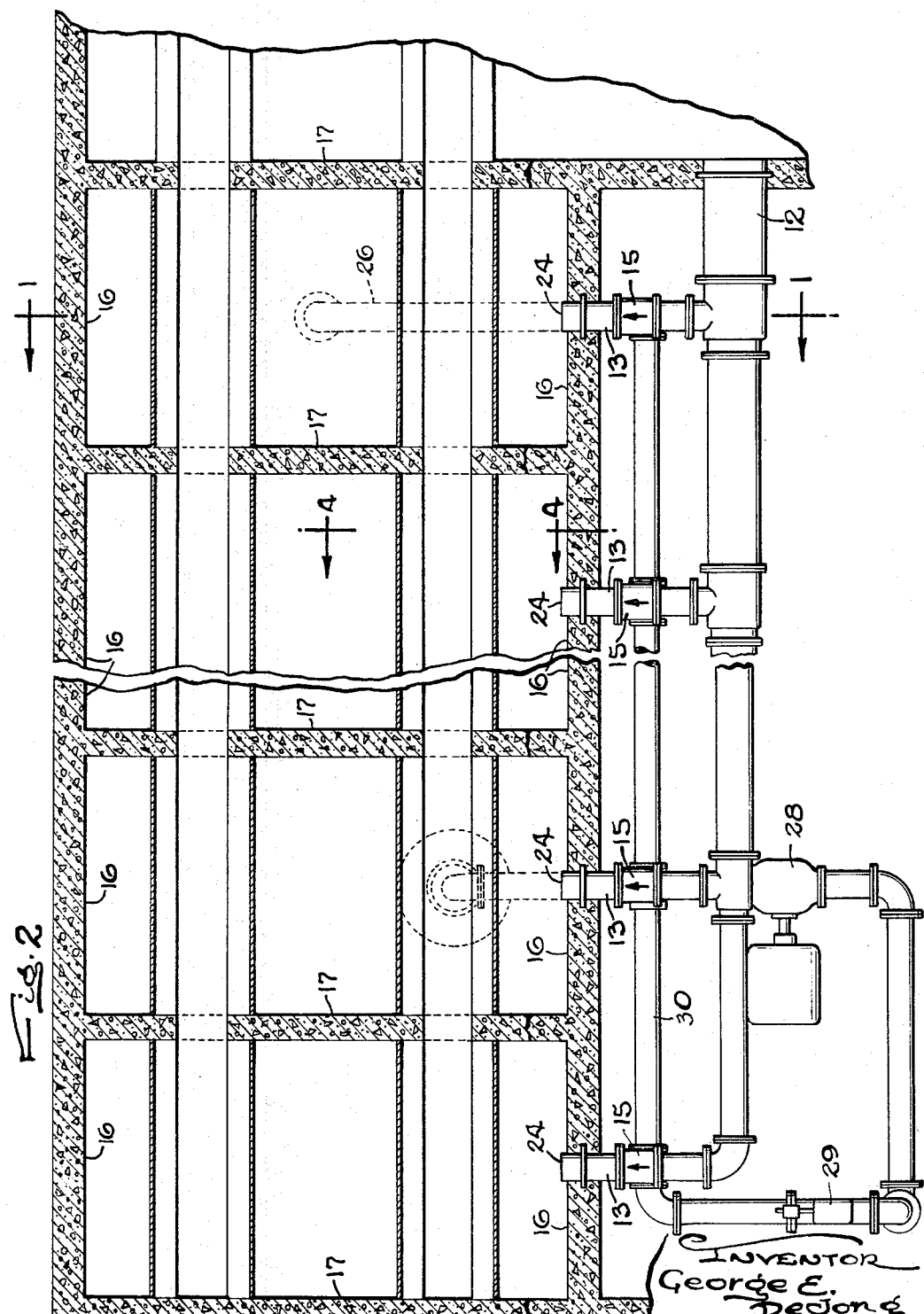
FIG. 2 is a fragmentary sectional view taken along the line 2—2 in FIG. 1.

As shown in the drawings for purposes of illustration, the invention is embodied in a filtration system such as may be used to filter large quantities of water for municipal and similar purposes. Raw water to be filtered is collected in a conventional open clarifier tank 10 (FIG. 3) from which it flows by gravity into the usual recarbination tank 11 and then into a filter influent line 12. The latter carries the influent through a plurality of branch lines 13 to a similar number of individual filter cells 14, the flow to the cells being under the control of valves 15 in the branches 13. The cells may be defined by concrete end walls 16, side walls 17 and bottom walls 18.

Herein, six cells 14 are employed and each is open at the top and contains a bed 19 of filter material such as a layer 20 of sand on top of a layer of gravel 21. The bed of sand and gravel is supported on a screen 22 (FIG. 1) spaced above the bottom of the cell and normally fills the cell to a level indicated at 23. The influent branch lines 13 constitute the inlets to the cells and open into the cells at 24 above the level 23 so that the water to be filtered enters the cells through the branch lines 13 and flows down through the beds 19.

Conventionally, about two gallons per minute per square foot of the surface of the bed 19 filters through the bed and the filtered water flows out of the cells 14 through branch pipes 25 which communicate with the cells below the screens 22 as shown in FIG. 1. The effluent branches 25 are connected to an effluent line 26 which carries the filtered water to a clear well 27 where it is stored.

During the filtering operation, solids in the raw water are deposited on or in the filter bed 19. When the latter becomes partially clogged, it is backwashed by flowing water upwardly through the bed. Usually, the backwash water is introduced at rate of about 15 gallons per minute per square foot of filter area and this water lifts the accumulated sediment up out of the bed and is discharged into a sewer.

Conveniently, the water from the clear well 27 is used for backwashing and is delivered by a pump 28 (FIGS. 1 and 3) through a check valve 29 in a line 30 to backwash inlet lines 31, there being one such line for each cell 14. Each backwash inlet line is controlled by a valve 32 and is connected to the corresponding effluent branch 25 between the cell and an effluent valve 33. During the filtering operation, the backwash inlet valve 32 is closed and the effluent valve 33 is open to permit filtered water to flow from the cell to the clear well 27 but, during backwashing, the effluent valve is closed and the backwash inlet valve is opened so that the pump 28 delivers backwash water to the bottom of the cell.

The present invention contemplates the provision of a novel arrangement of the filter apparatus by which the number of valves and controls are reduced and in which the steps required to change from filtering to backwashing and back are reduced without decreasing the efficiency or capacity of the filtering operation. This is achieved by forming the sewer line as a trough 34 which is disposed above the inlet 24 from the filter influent line 13 so that the backwash water and the sediment carried thereby merely spills over into the trough during backwashing but the trough is above the water level during the normal filtering operation. In this way, there is no need for any valve in the sewer line and the valves 15 in the influent branches 13 may be simple check valves not requiring complicated controls.

To these ends, the sewer trough 34 in the illustrated form of the invention is made of concrete and spans the side walls 17 of each cell 14. Preferably, two such troughs are employed and parallel each other to extend across the successive cells and empty into the clarification tank 10. The troughs are spaced inwardly from the ends of the cells and lead to the clarification tank so that the backwash water flowing in the channels 35 of the troughs is returned to this tank and refiltered in the normal operation of the apparatus. The effective height of the troughs and the depth of the channels may be varied by attaching plates 34ᵃ (FIG. 4) to the sides of the troughs to project above the latter.

With the foregoing arrangement, the capacities of the cells 14 may be designed so that one may be backwashed while the rest supply the full requirements of filtered water. In the condition shown in FIG. 3, the four cells on the left and the one on the right are filtering raw water from the recarbonation tank 11. The backwash valves 32 for these cells are closed while the corresponding effluent valves 33 are open. As a result, water from the tank 11 flows through the influent line 12, the check valves 15 and the branches 13 to these cells. This water filters down through the beds 19 and out through the effluent branch lines 25, the filtered water passing through the open valves 33 and the main effluent line 26 to the clear well 27.

Figure 3:
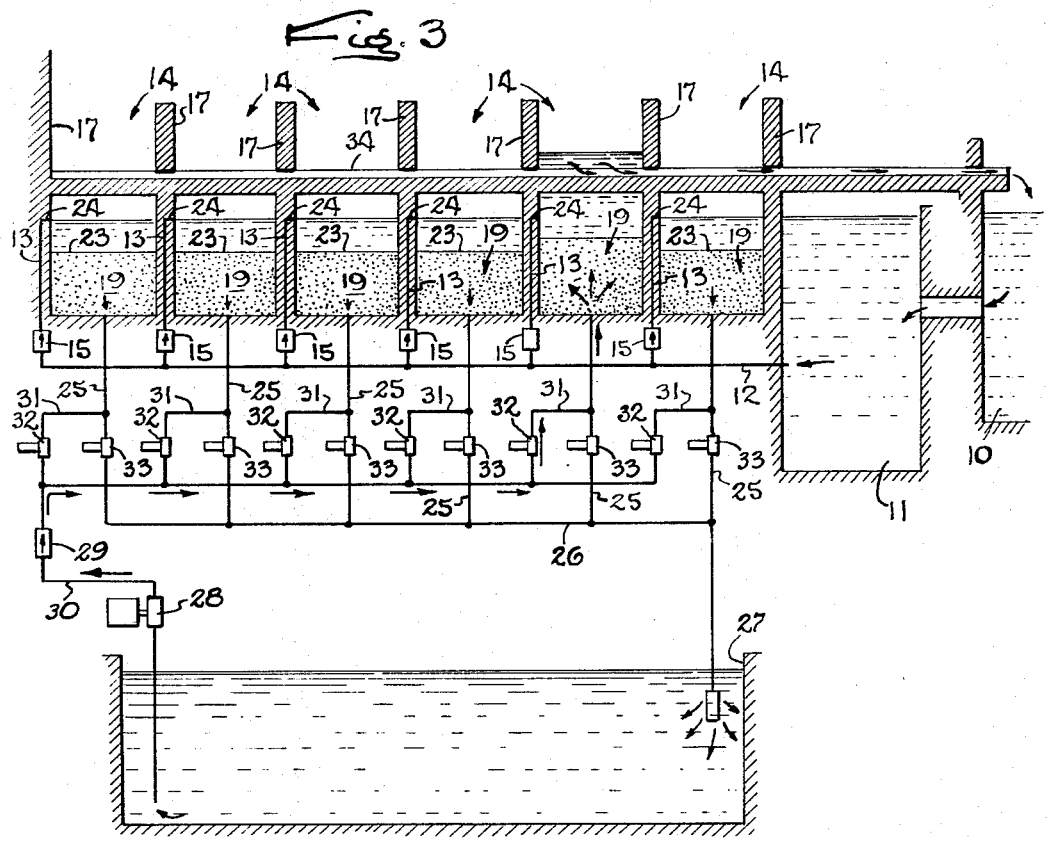
FIG. 3 is a schematic view of the system.

When a bed 19 becomes clogged, it is simply necessary to close the valve 33 for that cell 14 and open the associated backwash valve 32. This is the condition of the second cell from the right in FIG. 3 and results in the backwashing of the bed. Such backwashing is accomplished by water from the clear well 27 being delivered by the pump 28 to the backwash line 30 through the check valve 29. Water from the line 30 flows through the open valve 32 and the line 31 into the bottom of the cell 14. The water then flows upwardly through the bed 19 and expands the bed as illustrated in FIG. 3. This also raises the water level above the inlet 24 and the check valve 15 thereby automatically closes upon the tendency of a reverse flow through the branch 13.

Figure 4:
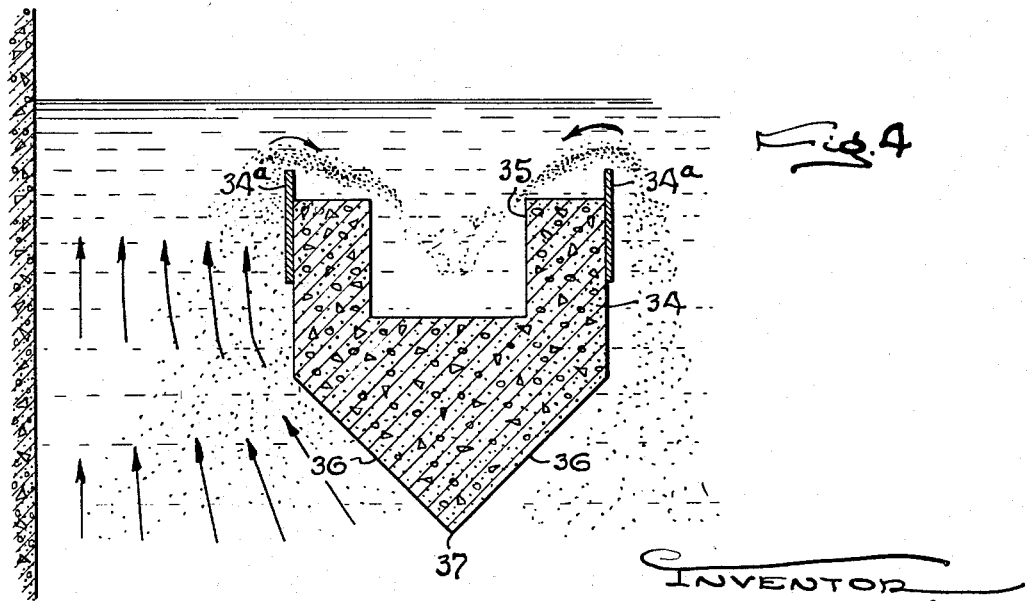
FIG. 4 is an enlarged fragmentary sectional view taken along the line 4—4 in FIG. 2.

With the check valve 15 closed, the water level rises in the cell until it is above the troughs 34 as shown in FIG. 4. As the water rises through the expanded bed 19, particles of foreign matter which have been filtered out of the raw water and which have clogged the bed are loosened from the latter and are lifted up with the backwash water. The water carrying these particles flows over into the sewer troughs and returns to the clarifier tank 10. When most of the foreign matter has been backwashed out of the bed in this manner, the valve 32 is closed and the valve 33 is opened. The bed then settles back on the screen 22 and the water in the cell filters down through the bed and flows back to the clear well 27. When the water level drops down to the outlet 24, the check valve 15 reopens and the normal filtering operation resumes. At that time, another one of the cells 14 may be backwashed.

To increase the velocity at which the backwash water rises in the cell 14 and thereby reduce the time of backwashing operation the troughs 34 are constructed so that they progressively reduce the effective cross sectional area of the cell. For this purpose, the underside of each trough is formed by faces 36 which are inclined downwardly and inwardly to meet at a point 37 which is spaced a substantial distance below the channel 35 but above the inlet 24. With the resulting V-shaped cross section of the bottom half of each trough, the area of the cell 14 is reduced progressively from the point 37 up to upper edges of the faces 36. This reduction in area increases the velocity of the flow of backwash water as it rises alongside the troughs and washes the foreign matter into the troughs more rapidly.

It will be observed that filter apparatus constructed according to the invention is simple and relatively inexpensive as compared with prior arrangements and this is achieved without loss of capacity or effectiveness. With the troughs 34, sewer valves are eliminated as are the associated operators and controls which otherwise would be required. Also, only check valves 15 are required to control the filter influent and this eliminates the need for operators and controls for these valves. Moreover, the system provides its own clear water for backwashing and refilters the backwash waste water.

I claim as my invention:

Liquid filtering apparatus comprising a plurality of filtration cells arranged in a horizontal row, each cell having a bed of filter material disposed within it and filling the cell to a predetermined level, a common header for liquid to be filtered, said common header communicating with a clarification tank containing liquid to be filtered, a liquid inlet conduit for each cell communicating with said common header, check-valve means in each inlet conduit, each of said inlet conduits opening to its cell above said predetermined level, a common filtered-water collection pipe discharging into a clear well, a plurality of outlet conduits each connecting the discharge of a filter cell with the common filtered-water collection pipe, an effluent valve in each of said outlet conduits, backwash means for effecting a reverse flow of liquid upwardly through the bed of filter material, said backwash means including a common backwash supply conduit having its source of supply in said clearwell, a backwash supply line for each filter cell connecting said common backwash supply line with the outlet conduit at a point between the cell discharge and the effluent valve, a backwash valve in each backwash supply line, backwash discharge means comprising at least one open trough extending across said cells at a level higher than the level at which said inlet conduits communicate with the cells, said trough terminating in said clarification tank, said trough having an upper portion with an upwardly-opening channel and having a depending lower portion decreasing in cross-section downwardly, the sidewalls of said cells along the trough being substantially upright, and said lower portion of the trough terminating at a point spaced a substantial distance below the channel to form a progressively and upwardly narrowing, substantially reduced effective cross-sectional area in each cell, whereby the velocity of the backwash liquid is increased adjacent the trough.

References Cited by the Examiner
UNITED STATES PATENTS

| | | | |
|---|---|---|---|
| Re. 24,275 | 2/1957 | Lawlor | 210—264 |
| 677,641 | 7/1901 | Davis. | |
| 1,069,737 | 8/1913 | Stevenson | 210—80 |
| 2,053,628 | 9/1936 | Paterson | 210—80 |
| 2,075,300 | 3/1937 | Pflanz | 210—80 |
| 2,084,659 | 6/1937 | Streanber. | |
| 2,199,891 | 5/1940 | Martin | 210—275 X |
| 2,242,652 | 5/1941 | Maxwell. | |
| 2,296,824 | 9/1942 | Ashworth | 210—80 |
| 2,559,784 | 7/1951 | Moore | 210—275 X |
| 2,879,891 | 3/1959 | Beohner et al. | 210—275 X |
| 3,111,487 | 11/1963 | Martin | 210—136 |

REUBEN FRIEDMAN, *Primary Examiner.*

HERBERT L. MARTIN, *Examiner.*

F. W. MEDLEY, R. A. CATALPA,
*Assistant Examiners.*